(12) United States Patent
Casper et al.

(10) Patent No.: US 12,538,062 B2
(45) Date of Patent: Jan. 27, 2026

(54) AFFIXABLE RECEPTACLES FOR PERSONAL AUDIO DEVICES

(71) Applicant: STOHZ, LLC, Lehi, UT (US)

(72) Inventors: Dolly Creger Casper, Lehi, UT (US); Phillip Bradley Casper, Lehi, UT (US)

(73) Assignee: Stohz LLC, Lehi, UT (US)

( * ) Notice: Subject to any disclaimer, the term of this patent is extended or adjusted under 35 U.S.C. 154(b) by 192 days.

(21) Appl. No.: 18/498,482

(22) Filed: Oct. 31, 2023

(65) Prior Publication Data

US 2024/0147124 A1 May 2, 2024

Related U.S. Application Data

(60) Provisional application No. 63/421,453, filed on Nov. 1, 2022.

(51) Int. Cl.
*H04R 1/10* (2006.01)
*H02J 7/00* (2006.01)

(52) U.S. Cl.
CPC .......... *H04R 1/1025* (2013.01); *H02J 7/0044* (2013.01)

(58) Field of Classification Search
CPC ........................... H04R 1/1025; H04R 1/1016; H04R 2460/17; H02J 7/0044; A45F 5/02; A45F 5/1508; A45F 5/1516
See application file for complete search history.

(56) References Cited

U.S. PATENT DOCUMENTS

| | | | | |
|---|---|---|---|---|
| 8,317,067 | B2 * | 11/2012 | Lewis | A45F 5/02 224/183 |
| 9,264,791 | B1 * | 2/2016 | Polivy | H04R 1/025 |
| 9,392,851 | B2 | 7/2016 | Lam | |
| 10,225,637 | B2 | 3/2019 | Panecki et al. | |
| 10,516,281 | B2 | 12/2019 | Dennis | |
| 11,317,209 | B1 * | 4/2022 | Curran | H04R 5/02 |
| 2008/0023508 | A1 * | 1/2008 | Harchol | A45F 5/02 224/183 |
| 2011/0230148 | A1 | 9/2011 | Demuynck et al. | |
| 2016/0134961 | A1 | 5/2016 | Shaffer | |

(Continued)

FOREIGN PATENT DOCUMENTS

CN  206302532 U  7/2017

*Primary Examiner* — Jason R Kurr
(74) *Attorney, Agent, or Firm* — Foley & Lardner LLP

(57) ABSTRACT

Devices and methods for conveniently storing earphones are disclosed. The disclosed embodiments can stow earphones proximal to the user's ear, such as on their shirt like a magnetic name tag to enable fast and easy access and storage and charging. The embodiments secure earphones while they are stowed and allow their easy removal. The proximity of the storage and the ease of earphone insertion and removal may reduce risk of losing earphones. The disclosed embodiments safely stow and may charge wireless earphones, allowing the original charging case to be stored in a designated location that does not need to be accessed throughout the day. The disclosed embodiments also eliminate the need for pockets, bags, etc. to safely stow earphones and their case. Once removed from a disclosed storage device, the earphones are unrestrained and not physically tethered. The disclosed embodiments can add to the convenience of using wireless earphones. The disclosed embodiments can be used on multiple earphone designs.

21 Claims, 11 Drawing Sheets

(56) References Cited

U.S. PATENT DOCUMENTS

| | | | |
|---|---|---|---|
| 2017/0094399 A1* | 3/2017 | Chandramohan | H04R 1/2826 |
| 2017/0289668 A1* | 10/2017 | Kim | H04M 1/6066 |
| 2018/0091887 A1* | 3/2018 | Minoo | H04R 1/1091 |
| 2019/0274416 A1* | 9/2019 | Paillasson | F16B 1/00 |
| 2021/0004050 A1* | 1/2021 | O'Neill | A45F 5/00 |
| 2022/0131967 A1* | 4/2022 | Kim | G06F 1/163 |
| 2022/0174390 A1* | 6/2022 | Sun | H02J 50/10 |
| 2022/0393495 A1* | 12/2022 | Liao | H02J 7/0047 |
| 2025/0097617 A1* | 3/2025 | Choi | H04R 9/02 |

* cited by examiner

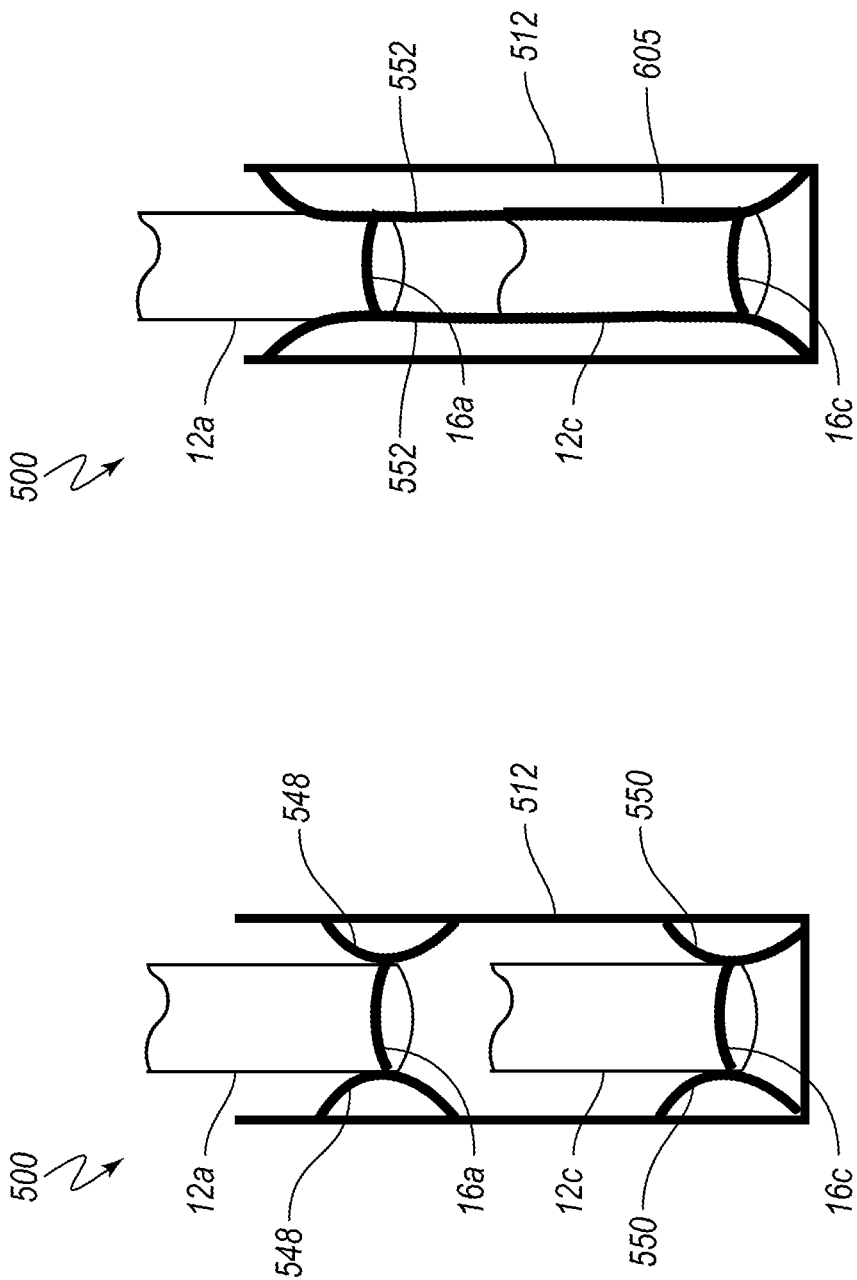

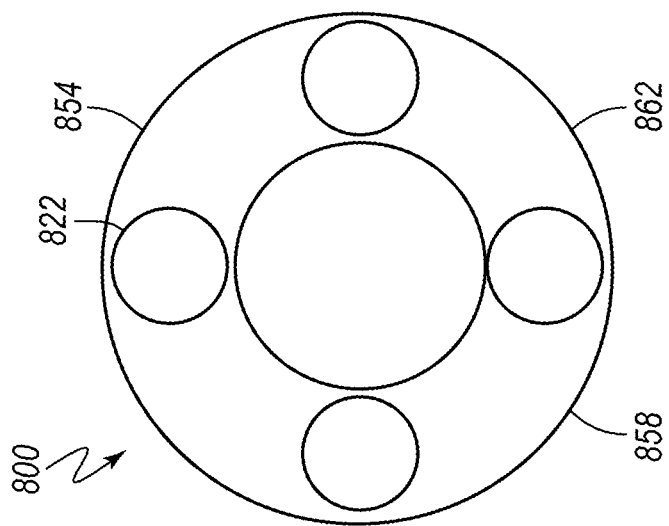
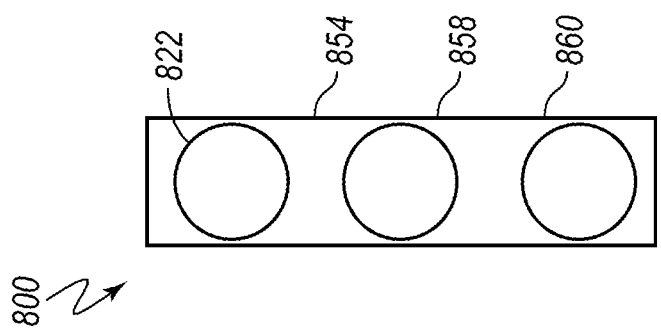
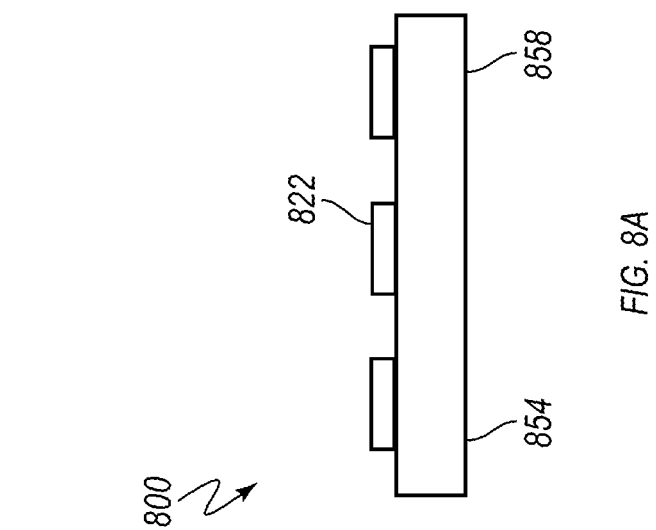

AFFIXABLE RECEPTACLES FOR PERSONAL AUDIO DEVICES

RELATED APPLICATIONS

This application claims the benefit of priority under 35 U.S.C. § 119 of U.S. Provisional Patent Application Ser. No. 63/421,453, entitled "METHODS AND SYSTEMS For PORTABLY STORING WIRELESS EARPHONE DEVICES," filed Nov. 1, 2022, the contents of such application being hereby incorporated by reference in its entirety and for all purposes as if completely and fully set forth herein.

TECHNICAL FIELD

This disclosure relates generally to the field of personal audio device storage, and more particularly to portably storing personal audio earphones at a user's person.

BACKGROUND

In 2021, shipments of wireless earbuds grew 24% year-over-year to reach 300 million. (See *Global TWS Shipments Grow* 24% *YoY to Reach* 300 *Million in* 2021, Counterpoint Research; Lee, L; Mar. 10, 2022.) Apple® customers alone were "expected to spend $700 million or more . . . just to replace lost AirPods® and charging cases in 2019 . . . " (See *People love AirPods so much they spend more than half a billion a year replacing them*; CBS News; Cerullo, M; Sep. 6, 2019 (emphasis added).) A common behavior of users is to randomly set down one or both earphones (e.g., Apple AirPods®, Samsung® Galaxy® Buds™, Sony® WF-1000-family headphone, etc.), or the earphones case, in a moment of necessity, such as when the user is in a hurry, speaking with another person in physical presence, etc.

Several loss-prevention devices exist, such as leashes that attach to the stems of earphones and allow the earphones to dangle around the user's neck like a necklace. One problem with this design is that, typically, leashes tightly connect to the earphones and prevent placing the earphones in the charging case. The leash may be difficult to detach, not only making charging difficult, but also simply using the earphones without the leash. It is also difficult to return the earphones to the leash system. The leash may also bounce during daily activity of the user, such as while the user is running, bending, etc., making a leash a poor solution for those exercising, cleaning, or performing other common tasks. A similar device, a holster, uses a material such as silicone to attach the earphone stems to the band of a watch. The holster uses friction to hold the earphones in place; however, the tight silicone also makes using the holster cumbersome as the friction makes earphone removal difficult. Furthermore, no loss protection devices like this exist for newer wireless earphones that may have quite short stems or be stemless.

Another loss-protection method is to place an OEM charging/carrying case in an enclosure that has a clip so the case can be mounted to a belt, bag, etc. to be more easily accessible. A problem with this option is that the case is still inconvenient to access, requiring two hands to open the case and insert or retrieve the earphones. Also, while stored in the charging case, the earphones are not connected to the user's audio device (e.g., Apple iPhone®, Apple iPad®, Samsung Galaxy®, etc.) and, once the earphones are removed from the case, they must connect to the user's audio device, which causes significant delay, especially when trying to answer a call, for example.

SUMMARY

The present disclosure is directed to receptacles to store wireless earphones conveniently and without the shortcomings of currently existing devices and methods, while also significantly reducing the likelihood of loss when a user forgets where s/he set down a(n) earphone/earphones or case, thus improving the customer experience with earphones.

BRIEF DESCRIPTION OF THE DRAWINGS

The present embodiments will become more fully apparent from the following description, taken in conjunction with the accompanying drawings. Understanding that the accompanying drawings depict only typical embodiments and are, therefore, not to be considered limiting of the scope of the disclosure, the embodiments will be described and explained with specificity and detail in reference to the following accompanying drawings.

FIG. 5A is a detailed diagram of a canal of a PSD, according to an embodiment of the present disclosure, showing charging pins.

FIG. 5B is a detailed diagram of a canal of to PSD, according to an embodiment of the present disclosure, having elongated charging pins.

FIG. 8A is a side view of the detachable back piece of a PSD, according to an embodiment of the present disclosure.

FIG. 8B is a top view of a detachable back piece of a PSD, according to an embodiment of the present disclosure.

FIG. 8C is a top view of a detachable back piece of a PSD, according to an embodiment of the present disclosure.

DETAILED DESCRIPTION OF PREFERRED EMBODIMENTS

No technology exists that allows earphones to be stored or charged on an article of clothing, such as a shirt, etc., like a pin, as will be described in the present disclosure. An embodiment of the present disclosure may enable a user to perform common tasks, such as exercise, cleaning, moving about freely, etc., without being encumbered by the earphone storage device. Although some quite limited portable storage devices currently exist for wireless earbuds having stems, no art exists for storing earphones without stems, even with the limitations of devices for storing earbuds with stems. Embodiments of the present disclosure can accommodate all varieties of earphones including those with or without stems and those with and without wires. Unlike other loss-prevention devices presently available, embodiments of the present disclosure provide a convenient, easy-to-use storage solution. Embodiments of the present disclosure allow the earphones to be used unencumbered by a leash, holster, etc. Embodiments of the present disclosure also provide fast and facile retrieval from and return of earphones to the storage device.

The present disclosure provides devices and methods to securely hold wireless stereo earphones conveniently at the user's person, such as on a shirt, a jacket, a lapel, a belt, a bag, a backpack, a watch, a watchband, a necklace, an armband, a hat, a lapel clip, a lapel pin, a sleeve clip, a belt attachment, etc.

Embodiments of the present disclosure eliminate the need for pockets or a bag to stow the earphones or earphone's case in order to avoid setting them down with the inherent potential of leaving without retrieving the earbuds. Embodiments of the present disclosure also enable a user to leave the case in a safe location that may not be readily accessible throughout the day, such as on a nightstand or in a bag.

The present disclosure can utilize the inherent and native magnetism found in the speaker of earphones and any additional magnets manufactured into the earphones.

Figure 1A:
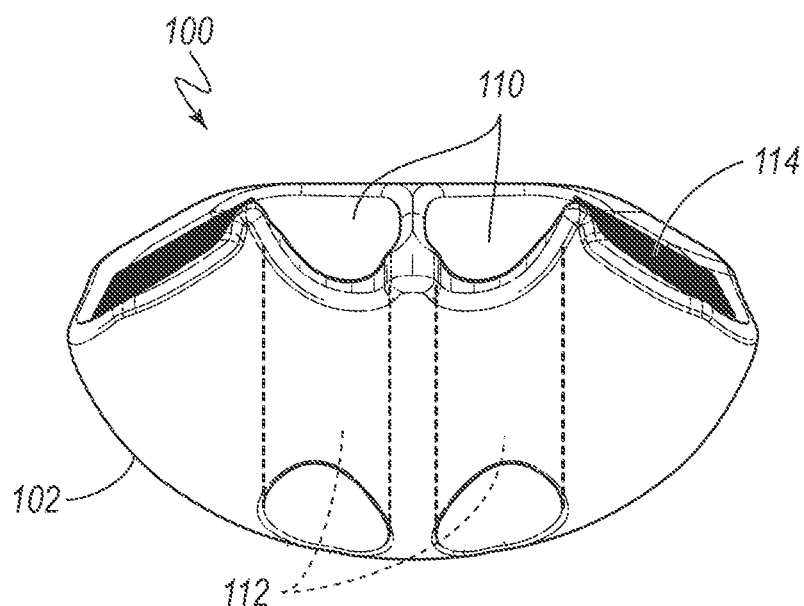
FIG. 1A is a perspective view of a portable wireless storage device ("PSD") according to an embodiment of the present disclosure.

FIG. 1A is a perspective view of a portable personal audio device (e.g., wireless earphones) storage device ("PSD") 100 according to an embodiment of the present disclosure. The PSD 100 of FIG. 1A is a receptacle having a support body 102 (or simply body) configured to accept earphones with a stem. The stem may have a length (e.g. a first length). As detailed elsewhere herein, the body 102 is configured to be affixed to a surface of an article and to be portable with the surface of the article. The PSD 100 comprises magnets 114 located at or otherwise disposed to be positioned just beneath the necks (e.g., a top of a stem) of the earphones inserted into the PSD 100 the magnets 114 to couple to the magnetic portion of the earphone to secure it. No closure is necessary to secure earphones. An open top enables the user to insert and remove the earphones into the PSD 100 using, e.g., two fingers of one hand. Of note, the PSD 100 of the present embodiment does not comprise a lid or closure to keep the earphones secure, thus reducing an extra step required to access/store earphones. The PSD 100 also enables access/storing using one-hand instead of two, which is largely required using the manufacturer-supplied charging cases. The PSD 100 can be charging or non-charging. A charging PSD 100 may charge the earphones using a wired or wireless connection. In a wireless charging embodiment, the wireless charging components may be disposed so as to be hidden behind an inner aspect of the item to which the PSD 100 is applied, and enable a more simple, non-charging storage device to be worn at an outer aspect of the item. In one embodiment, the PSD 100 may be configured to have interchangeable rear portions to enable a user to select a non-charging rear portion or a charging rear portion, as occasion may warrant. Wired charging pins within the PSD 100 can electrically couple to the stems of the earphones at multiple locations along a shaft, a stem, etc., to enable contact with earphones of varied stem length, for example the long stem of the AirPod Pro Gen 2 and the shorter stem of the AirPod Gen 2 and Pro models (see the AirPod Pro Gen 2 and AirPod Gen 2 and AirPod Pro models in FIGS. 5A and 5B). More generally, the personal audio devices may be earbuds or earphones having a first portion housing a speaker and a second portion, a stem, extending away from the first portion. The first portion of the personal audio device is configured to be disposed in an outer ear of a user, while the stem is configured to be positioned outside of the outer ear. The PSD 100 can also contain wireless charging components to both charge the earphones and to be charged by an external wired or wireless charger. The PSD 100 may comprise an energy store (e.g., a battery) and circuitry to electrically charge the personal audio devices.

In one embodiment, the charging device of the PSD 100 may comprise a rechargeable battery, such as, e.g., a lithium-ion battery, a nickel-cadmium battery, etc. In one embodiment, the battery of the charging device may be removeable/replaceable. The battery of the charging device can be recharged wirelessly, by a wired electrical connection, or may be replaceable by a replacement battery. The PSD 100 may comprise multiple batteries that can be charged internally or external to the PSD 100 and may be replaced as needed (swappable). In a non-charging embodiment, the PSD 100 can be made smaller and lighter because no charging contacts or components are required. This non-charging embodiment can be convenient for an individual who does not need to use their earphones long enough to run the earphone battery down. In such an embodiment, the user may recharge the earphones with the original charging case that came with the earphones. The non-charging PSD 100 can be used to stow the earphones between charges.

The PSD 100 may be configured to enable a user to use only one hand to add or remove earphones. This functions to aid in the ease of access of earphones within or returned to the PSD 100. The earphones can remain connected to the user's phone while the earphones are in the PSD 100 so that there is no need to establish a connection to the phone in order to answer a phone call. This enables users to answer a call more rapidly than is possible when the earphones are stored in the manufacturer-provided case. In one embodiment, the PSD 100 can allow earphones to disconnect while within the PSD 100 to preserve the battery life of the earphones (and of the charging device of a charging-enabled PSD 100), and to enable the user to use the phone without the connection to the earphones. In one embodiment, the PSD 100 can have, e.g., a lid, a cap, or other closure, to lock the earphones in place. The PSD 100 can remain open without a lid, cap, etc., and can retain the earphones using any method described herein. The PSD 100 can be made of metal, such as stainless steel or precious metals like, e.g., sterling silver, silver, gold, neodymium, etc. The PSD 100 can be made of plastic, such as, e.g., ABS, silicone, polyurethane, etc. The PSD 100 can be made of wood, such as, e.g., cedar, birch, pine, cherry, oak, elm, etc., or of a wood-like substitute/simulant. The PSD 100 can be made of a ceramic such as glass or ceramic ferrite magnets.

The PSD 100 can be configured to look like jewelry. The PSD 100 can be trim, lightweight, and aerodynamic. The PSD 100 can be configured by printing, embossing, debossing, or any other suitable means to impart a logo, such as a logo of a manufacturer company or logos/emblems from other companies, franchises, studios, industries, etc. By way of non-limiting examples, such logos may represent Star Trek™, Star Wars®, etc. The PSD 100 may be configured to accommodate a particular model, or multiple models of wireless stereo earphones, and even wired earphones. The PSD 100 may be configured to accept the stem of the earphones. The PSD 100 may be configured to retain each earphone by securing the earpiece (a portion of the earphone that inserts into the ear). The PSD 100 may be configured to engulf and/or surround a portion of the earphone or the entire earphone to retain the earphone in place. Such an embodiment can enable the earphone to be accessed from the front of the disclosed device like that described in FIG. 6. The PSD 100 may more readily enable blind insertion, wherein the user does not need to look at the PSD 100 to insert or retrieve the earphones.

The PSD 100 can be made to match a shape of the earphones to reduce the size of the PSD 100. A non-limiting example can be seen in a device shaped like a "T" to accommodate the "T-shape" that many wireless earphones form by extending a stem from a speaker housing. The PSD 100 may be configured to accept earphones from top-down, bottom-up, from a side or from the front, etc. The PSD 100 may be made entirely of magnetic material. The PSD 100 may be configured with one or more magnets to attach to magnets or magnetic material such as magnetic stainless steel in the earphones. In one embodiment, the PSD 100 may be made of a magnetic material with a shape, such as, e.g., a U-shape, to securely hold the earbuds within the PSD 100. In one embodiment, earphones may attach to the PSD 100 using a tight, form-fitting enclosure, such as, e.g., tight-fitting plastic that securely holds the whole or a part of the earphone such as, e.g., a stem. In one embodiment, a flexible foam material (similar to that used in some earplugs), can be used to surround and secure the earphones. Examples of foam material include, for example, silicone, thermoplastics, nylon, etc, in one embodiment, a rubberized plastic coating, a silicone coating, a hook-and-loop material, a polymeric cilia-like appendage, etc., can be used to increase friction between the PSD 100 and the earphones to secure the earphones. By way of non-limiting example, the PSD 100 can be made of silicone or rubberized plastic and provide sufficient friction to secure the earphones.

In one embodiment, a one-way valve/door can be used to easily place the earphones into the PSD 100 and then secure the earphones in place until they are intentionally removed in an opposite or generally opposite direction, or in an orthogonal direction. In one embodiment, a clip can be used to clip the earphones to the PSD 100. In one embodiment, one or more one-way appendages that permit easy insertion into the PSD 100 but require more force to remove from the PSD 100 can be used to secure the earphones to the PSD 100. In one embodiment, a highly compliant polymer that partially engulfs the earphones can be used to secure them to the PSD 100. In one embodiment, the PSD 100 may comprise a non-Newtonian polymer, such as Gak™, that offers less resistance when the earphones are pulled slowly and offers increasing resistance with increasing force/speed applied to attempt to remove the earphones. This will keep the earphones safe when the wearing user is, e.g., jumping, running, or experiencing centrifugal force. In one embodiment, the PSD 100 may comprise a Chinese finger trap mechanism that easily accepts the earphones but offers resistance when the earphones experience force such as, e.g., a hug, jumping jacks, etc. Removal from the Chinese finger trap mechanism can be accomplished by means of a release component to defeat the "finger trap."

A PSD 100 may incorporate a mechanism that prevents the earphones from moving in at least the X and Y directions, or in directions having substantial X or Y components. In some embodiments affording such X/Y limitation, movement may be less restricted in a Z direction (e.g., pulling away from a body, a force that is not highly likely while running, getting hugged, etc.). An example of this would be a brush-like feature having bristles all facing inward (relative to the PSD 100) with the earphone nesting in the center of the bristles. There would be large forces surrounding the earphone, but few and low forces to push the earphones into the device or pull the earphone away from the user and out of the PSD 100. In one embodiment, the PSD 100 can have an open front portion that exposes the shaft for the stems of the earphones to enable easy insertion by allowing the end of stems to fall into a notch before sliding the earphone fully into position (see FIGS. 2A and 2B). The present disclosure anticipates embodiments permitting inserting the stems of the earphones into the PSD 100 from various approach angles, and configurations of the PSD 100 enabling the PSD 100 to accept earphones from any orientation and approach angle. Furthermore, the present disclosure anticipates embodiments having a variety of earphone orientations, such as, e.g., facing in, facing out, facing up, facing down, facing at an angle, etc.

Figure 6:
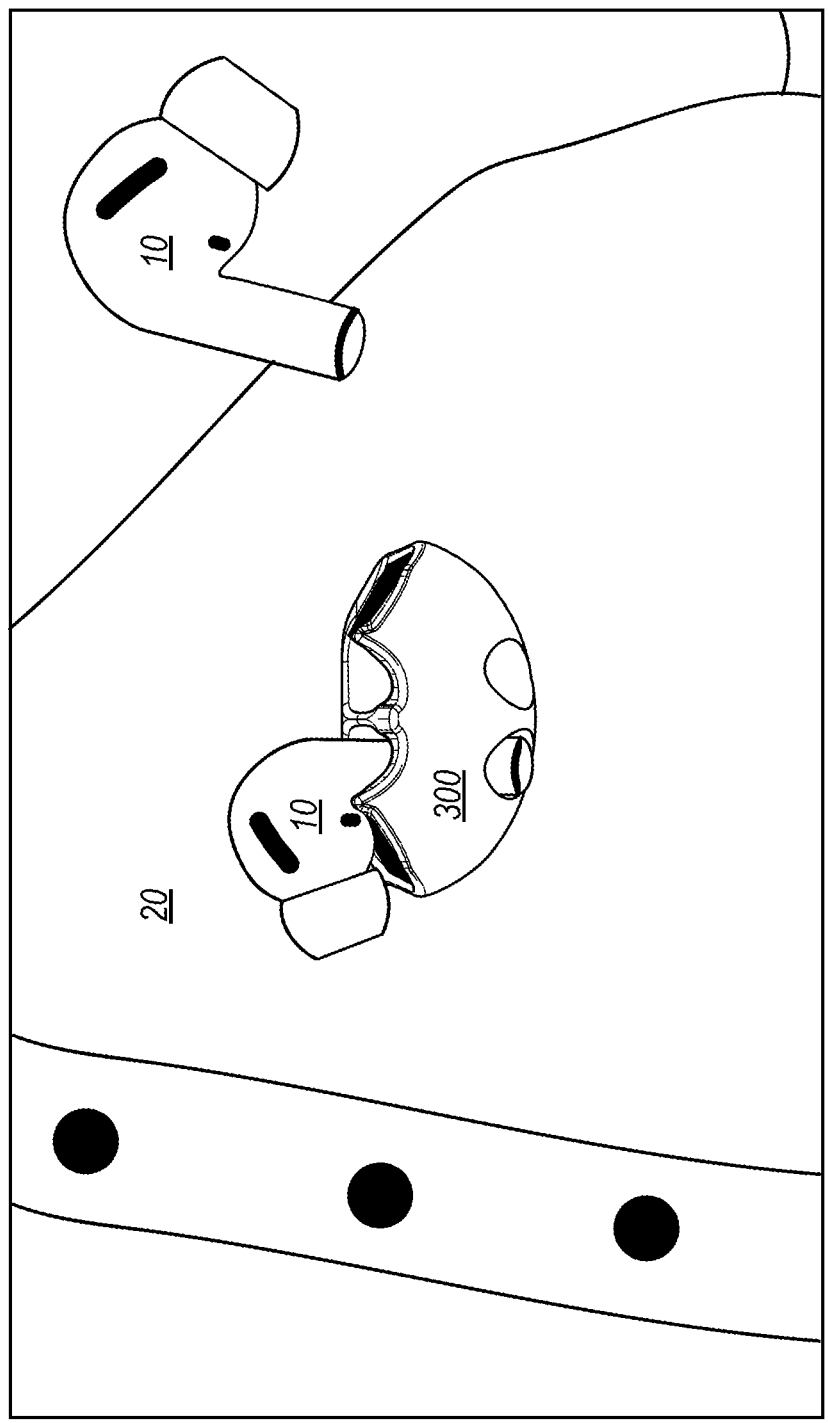
FIG. 6 is a perspective view of a PSD, according to an embodiment of the present disclosure, and with the PSD disposed at a shirt.

The PSD 100 can be affixed to an article of clothing (such as, e.g., a shirt, a coat, a jacket, a pocket, a lapel), an accessory (such as an armband, a watch band, a hat, a belt, bracelet, necklace etc.), a bag, a backpack, etc., using magnets, clips, pins, hook-and-loop material, etc. Stated otherwise, the PSD 100 comprises an affixing mechanism mounted to the body 102 configured to releasably secure the body 102 to an article. For example, FIG. 6 shows a PSD affixed to a shirt. The PSD 100 has a detachable back piece integrated with one or more magnets that reside on the inside of the shirt and attracts the PSD 100 having a ferro-magnetic plate (such as the PSD 800 detailed in FIG. 7A). The shirt is compressed using the magnetic force between the ferro-magnetic plate and the magnet(s). In one embodiment, the magnet(s) may be integrated in the PSD 100 to magnetically attract a ferro-magnetic plate located inside the shirt. An armband may be fabricated to integrate a non-removable PSD 100. In such an embodiment, the armband would be removable from or repositionable on the user's arm, leg, etc. In one embodiment, a clip may be integrated to the PSD 100, permitting the PSD 100 to be clipped onto a hat, strap, etc. The pin may take a form similar to a broach that is secured through a shirt, backpack or other mounting material to a fastener. The pin or, in some instances, a clip can be lighter and more secure than a magnet. Hook-and-loop material can be used to fasten the PSD 100 to a mounting fabric, it may be lighter than a magnet, but may be more difficult to remove. Stated otherwise, the affixing mechanism of the PSD 100 may comprise a pin. The pin may further comprise a joint to allow the pin to pivot at a coupled end, and a catch to releasably secure a free end of the pin. More generally, the affixing mechanism may comprise at least one of a magnet, a clip, a pocket clip, a pin, and a hook-and-loop fabric.

FIG. 1A is a perspective view of a non-charging PSD 100 according to an embodiment of the present disclosure, wherein the PSD 100 is configured to accept earphones having various stem lengths. The PSD 100 can be hollow to be lighter. The PSD 100 is lightweight and streamlined. A recess 110 is shown that is particularly configured to receive the earpiece of the earphone to nest in the PSD 100. Two receiving cavities or recesses (e.g., and hereafter, "canals") 112 are formed in the body 102 to correspond to a pair of personal audio devices. The canals 112 are configured to receive a first portion (stems) 12 of the earphones. The two canals 112 are unenclosed with an open top to provide ready access for a user to be able to grasp (e.g., the second portion of) the personal audio devices.

Figure 1B:
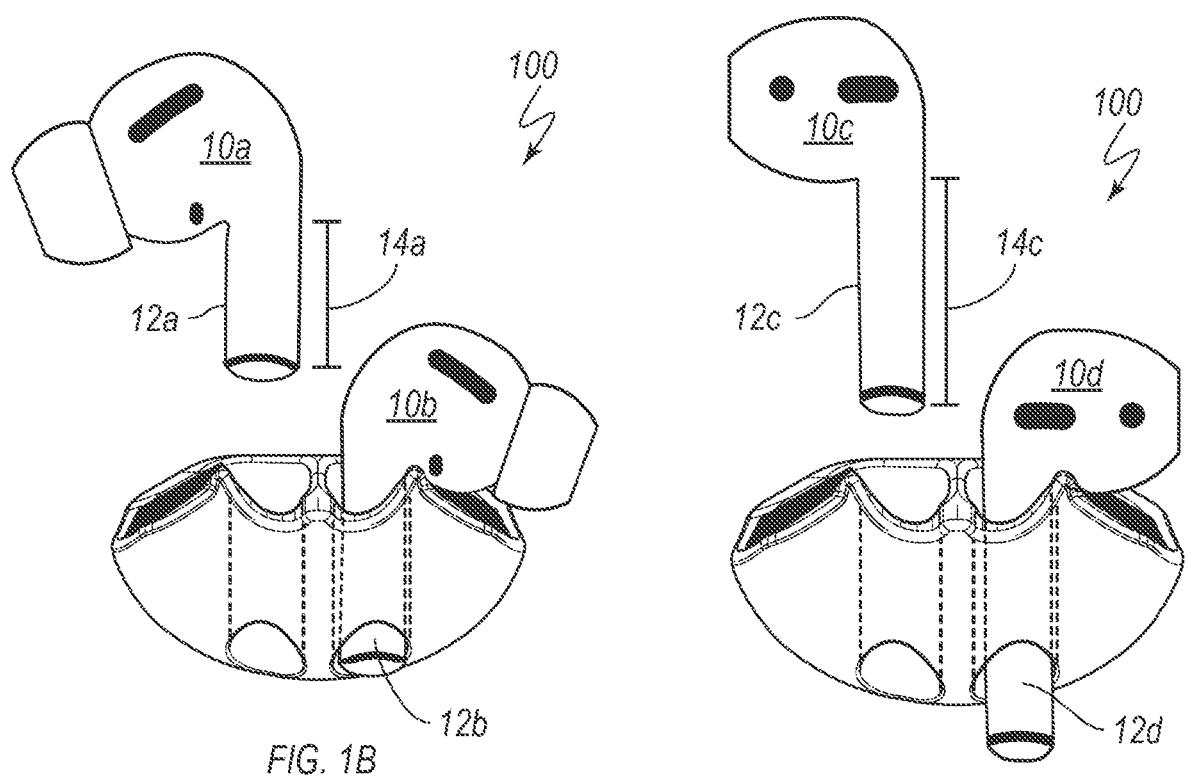
FIG. 1B is the PSD from FIG. 1A receiving and housing earphones having a first length.

FIG. 1B is a perspective view of the PSD 100 according to an embodiment of the present disclosure, the PSD 100 configured to accept earphones 10a, 10b having stems 12a, 12b of a first length 14a. The stem 12a, 12b can be inserted from top downward 2 according to this embodiment. In another embodiment, the earphones 10a, 10b may be inserted from another direction. The PSD 100 is open to enable one-handed insertion and removal of the earphones 10a, 10b.

Figure 1C:
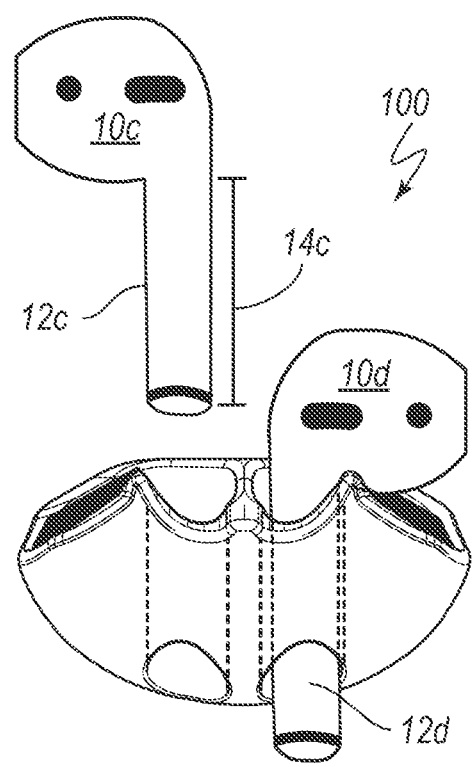
FIG. 1C is the PSD from FIG. 1A receiving and housing earphones having a second length.

FIG. 1C is a perspective view of the PSD 100 according to an embodiment of the present disclosure, wherein earphones 10c, 10d have stems 12c, 12d of a second length 14c.

FIGS. 2A-2F depict an embodiment of a portable personal audio device storage device ("PSD") 200 that resembles the PSD 100 of FIGS. 1A-1C above in certain respects. Accordingly, like features are designated with like numerals, with the leading digit(s) incremented to "2." Relevant disclosure set forth above regarding similarly identified features thus may not be repeated hereafter. Moreover, specific features of the PSD 100 and related components shown in FIGS. 1A-1C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the PSD 200 and related components depicted in FIGS. 2A-2F. Any suitable combination of the features, and variation of the same, described with respect to the PSD 100 and related components illustrated in FIG. 1A-1C can be employed with the PSD 200 and related components of FIG. 2A-2F, and vice versa. Furthermore, a feature referenced by numerals and alphabetic suffix, such as the earphones 10a, 10b, 10c, 10d of FIGS. 2A-2F, may be collectively referenced by omitting the alphabetic suffix whereby, e.g., the earphones 10a, 10b, 10c, 10d, et seq., are referenced as 10. This pattern of disclosure applies equally to further embodiments depicted in subsequent figures and described hereafter, wherein the leading digits may be further incremented.

Figure 2A:
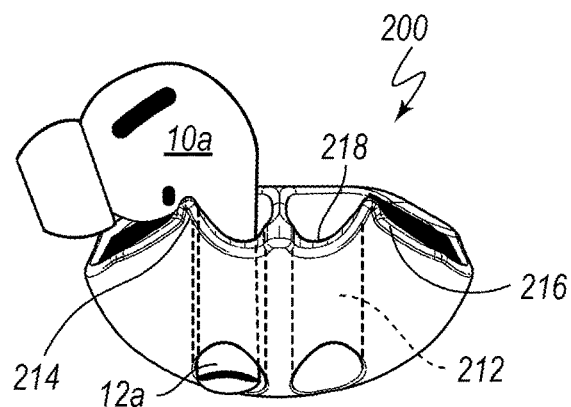
FIG. 2A is a front view of a PSD according to an embodiment of the present disclosure showing horns, lips and a notch to guide and prevent earphones from rotating

FIG. 2A is a perspective view of a PSD 200, according to an embodiment of the present disclosure, wherein the PSD 200 has horns 214 and lips 216. The PSD 200 has bilaterally disposed horns 214 lips 216 that may retain the earphones (earphone 10a shown) in place and protect them from rotating. Exposed canals 212 are provided to receive the stems (stem 12a shown) of the earphones 10. Each canal 212 is configured with a notch 218 that can guide the stems 12 into place within the canals 212. The notch 218 may be configured to engage or receive a bottom surface of the second portion of the personal audio device.

Figure 2B:
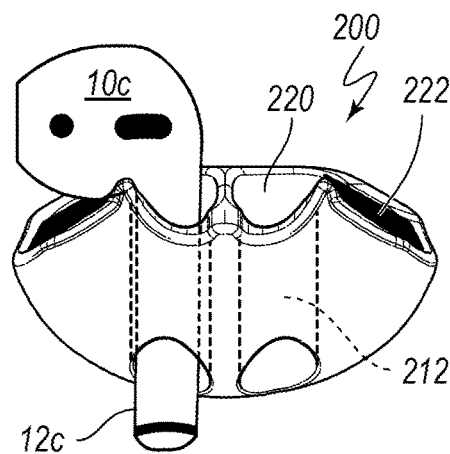
FIG. 2B is a front view of the PSD of FIG. 2A, according to an embodiment of the present disclosure, wherein the canals have raised backs.

FIG. 2B depicts the PSD 200 of FIG. 2A, according to an embodiment of the present disclosure, the canals 212 having raised backs 220. Each canal 212 has a raised back 220 that may guide the stem 12 of the earphone 10 into the canal 212. The canals 212 are open at the top and bottom to accommodate earphones 10 with stems 12 of various lengths. Magnets 222 are shown angled back to front and outside to inside to firmly secure various earphone models. The magnets 222 are sufficiently strong to secure the earphones without the need for a lid or other closure, etc. Stated otherwise, the PSD 200 comprises a retention mechanism in the form of a magnet to produce a magnetic field within the or at or near the canals 112.

Figure 2C:
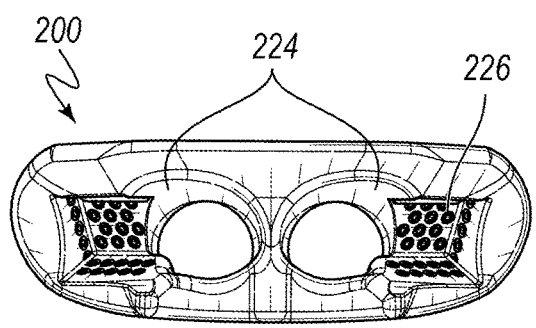
FIG. 2C is a top view of the PSD of FIGS. 2A and 2B, according to an embodiment of the present disclosure, and showing funnels.

FIG. 2C is a top view of the PSD 200 of FIGS. 2A, 2B, according to an embodiment of the present disclosure, and showing funnels 224. Funnels 224 may guide the stems from various angles (see the stems 12 of FIGS. 1B-2B). In FIG. 2C, the magnets 222 of FIG. 2B are omitted to show a pattern and texture 226 of the underlying surface that may facilitate securely affixing (such as, e.g., by epoxy, etc.) the magnets 222 to the PSD 200.

Figure 2D:
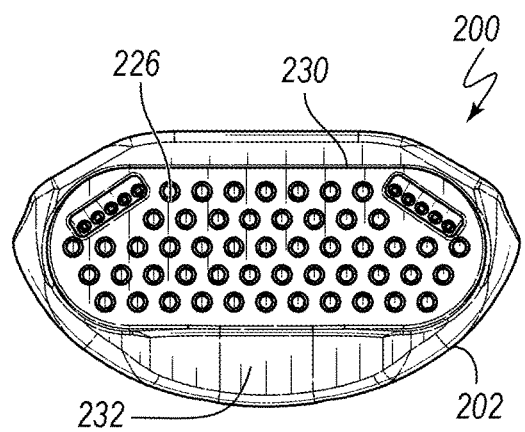
FIG. 2D is a rear view of the PSD of FIGS. 2A-2C, according to an embodiment of the present disclosure, and showing a pattern and texture.

FIG. 2D is a rear view of the PSD 200 of FIGS. 2A-2C, according to an embodiment of the present disclosure, and illustrating a recess 230 at a rear portion of the body 202. The recess 230 is configured to receive a ferromagnetic plate (see the ferromagnetic plate 446a of FIG. 4C and 746 of FIGS. 7A and 7B) that is bonded, for example epoxy, etc., to the recess 230. With the ferromagnetic plate bonded to the recess 230, the PSD 200 is configured to receive material and a magnetic detachable back piece (see the detachable back piece 754 of FIGS. 7A and 7B). The coupling of the ferromagnetic plate to the magnetic detachable back piece may serve to affix the PSD 200 to material, such as a shirt, a blouse, etc. In other words, the body 202 includes a recess 230 where the magnetic detachable back piece can nest and lock into place to reduce slippage relative to the surface of an article (see the back piece 754 and the article (e.g., a shirt, a blouse, etc. 20) of FIG. 7A). A pattern and texture 226 (which may resemble the pattern and texture 226 of FIG. 2C) may facilitate securely affixing (such as, e.g., by epoxy, etc.) the metal plate to the PSD 200. A depression 232 is provided to enable a facile grip for removing/repositioning the PSD 200 from/on a surface.

Figure 2E:
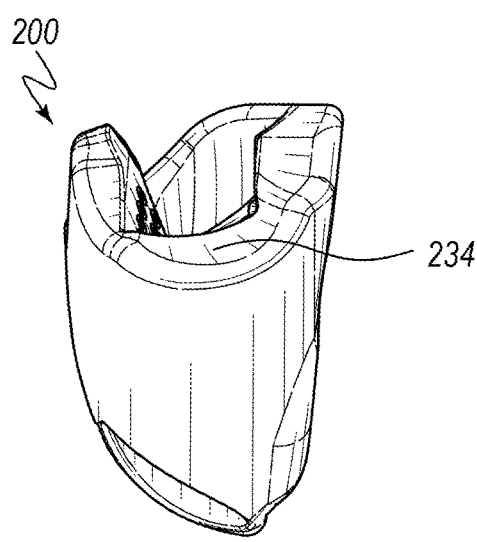
FIG. 2E is a side perspective view of the PSD of FIGS. 2A-2D, according to an embodiment of the present disclosure, and the PSD configured with bowls.

FIG. 2E is a side perspective view of the PSD 200 of FIGS. 2A-2D, according to an embodiment of the present disclosure, and the PSD 200 configured with bowls 234 are configured to accept an upper portion (a head) of earphones. The bowls 234 may reduce friction on the head of the earphones by reducing forces applied to the heads of the earphones. The bowls 234 may reduce wear such as to silicone earpieces of the earphones. The bowls 234 may also reduce potential rotation of the earphone head. The recess 230 and/or canals 212 may also be configured to limit movement of the earphones.

Figure 2F:
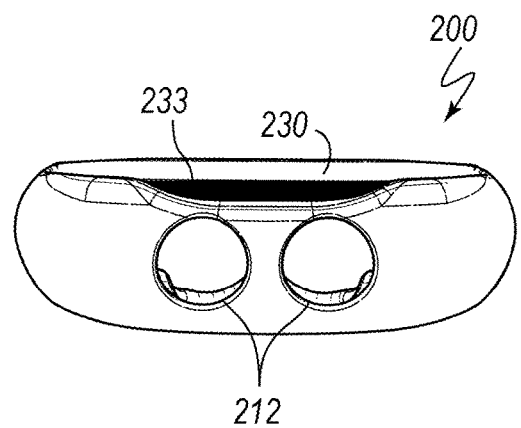
FIG. 2F is a bottom perspective view of the PSD 200 of FIGS. 2A-2E, according to an embodiment of the present disclosure, with the recess more particularly illustrated.

FIG. 2F is a bottom perspective view of the PSD 200 of FIGS. 2A-2E, according to an embodiment of the present disclosure, with the recess 230 more particularly illustrated. The canals 212 are identified for reference.

Figure 3A:
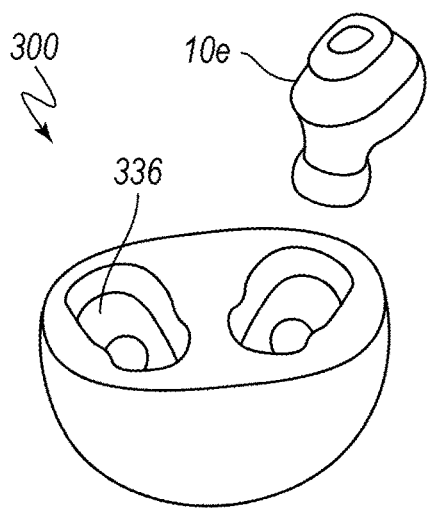
FIG. 3A is a perspective view of a PSD according to an embodiment of the present disclosure, wherein receptacles are configured to receive earphones without stems.

FIG. 3A is a perspective view of a PSD 300 according to an embodiment of the present disclosure, wherein receptacles 336 are configured to receive non-stem earphones (earphone 10e shown) inserted downward from the top. This receptacle 336 may at least partially encapsulate the earphones 10 to provide security. The present disclosure anticipates embodiments incorporating charging pins to electrically couple to and charge the earphone(s) 10.

Figure 3B:
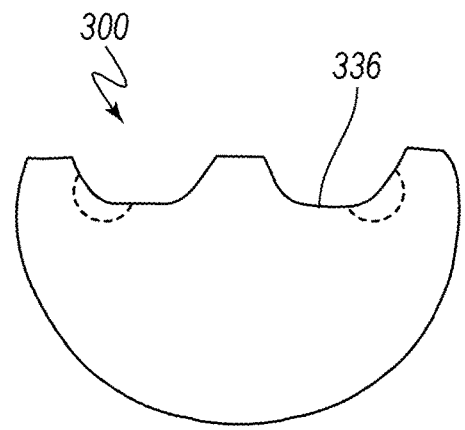
FIG. 3B is a front view of a PSD, according to an embodiment of the present disclosure, wherein the receptacles 336 are configured to accept earphones without stems.

FIG. 3B is a front view of a PSD 300, according to an embodiment of the present disclosure, wherein the receptacles 336 are configured to accept earphones without stems from the top downward (see the earphones 10 and the stems 12 of FIGS. 1B-2B).

Figure 3C:
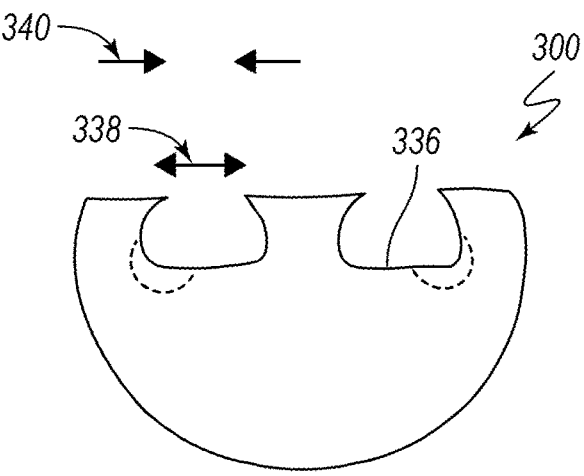
FIG. 3C is a front view of a PSD 300, according to an embodiment of the present disclosure, wherein the receptacles 336 are configured to act as a clip to accept and retain earphones.

FIG. 3C is a front view of a PSD 300, according to an embodiment of the present disclosure, wherein the receptacles 336 are configured to act as a clip to accept and retain earphones (see the earphones 10 of FIGS. 1B-2B and 3A). The receptacles 336 may expand in a outward direction 338 to accept the earphones 10 and to contract in an inward direction 340 to retain the earphones in place until an adequate force is applied in the outward direction 338 to overcome the clip-like function (see the earphones 10 of FIGS. 1B-2B). In one embodiment, the earphones 10 can be removed in an orthogonal direction to bypass the clip-like function.

Figure 3D:
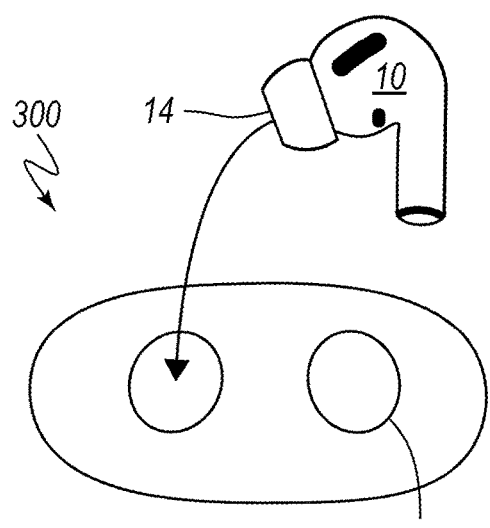
FIG. 3D is a front view of a PSD, according to an embodiment of the present disclosure, the receptacle configured to accept an inner earpiece of the earphones.

FIG. 3D is a front view of a PSD 300, according to an embodiment of the present disclosure, the receptacle 336 configured to accept an inner earpiece 14 of the earphones 10 into the front of the device.

Figure 3E:
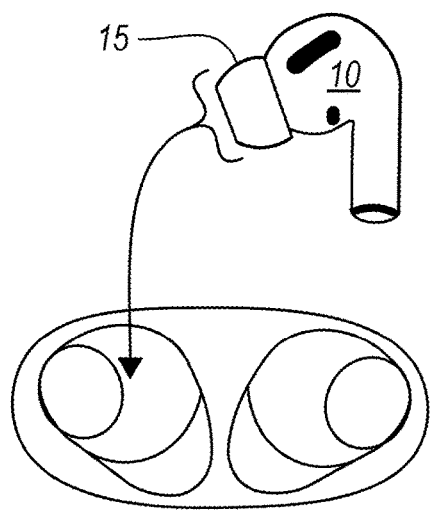
FIG. 3E is a front view of a PSD, according to an embodiment of the present disclosure, the receptacle configured to encapsulate a larger portion of the earphones.
Figure 4A:
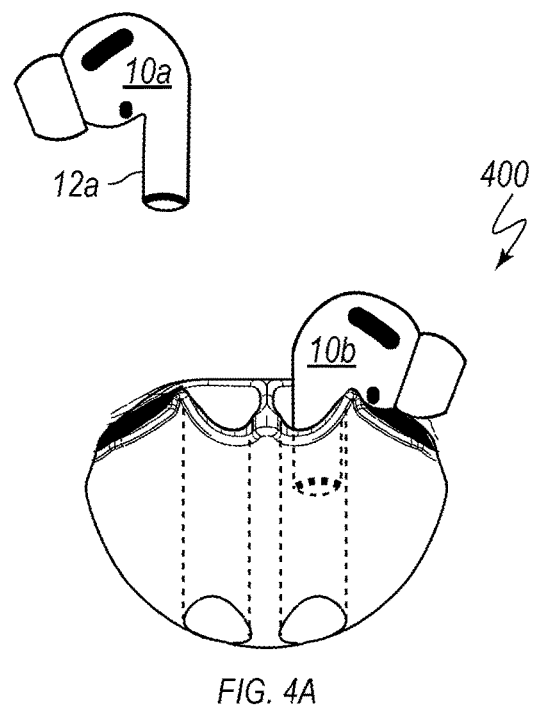
FIG. 4A is a perspective view of a PSD, according to an embodiment of the present disclosure, wherein the PSD is configured to accept earphones having a stem of a first length.
Figure 4B:
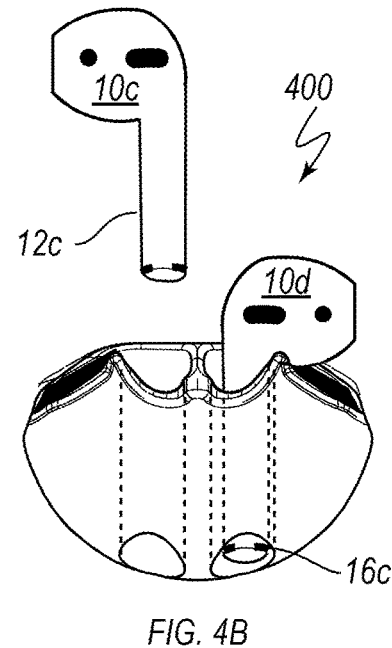
FIG. 4B is a front view of a PSD, according to an embodiment of the present disclosure, wherein the PSD is configured to accept earphones having a stem of a second length.
Figure 4C:
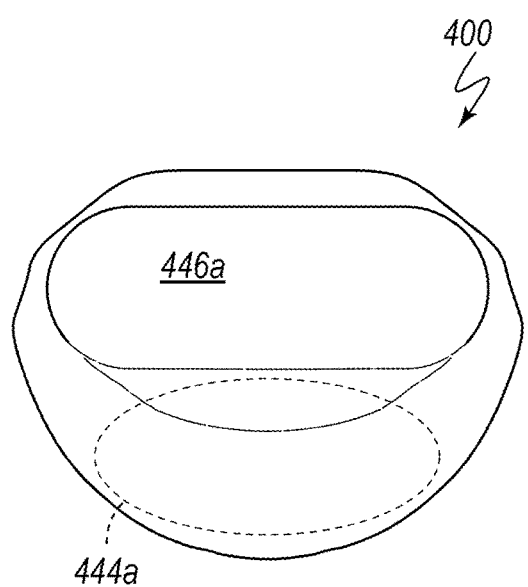
FIG. 4C is a rear view of the PSD of FIGS. 4A, 4B, according to an embodiment of the present disclosure, and having a wireless charging coil.
Figure 4D:
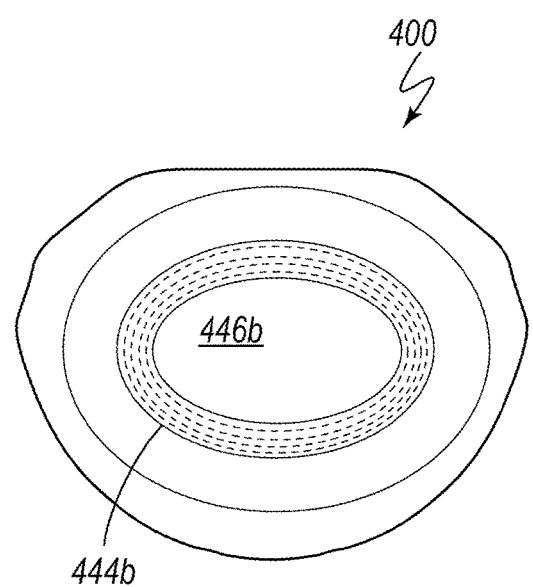
FIG. 4D is a rear view of the PSD of FIGS. 4A and 4B, according to an embodiment of the present disclosure, and showing a charging coil integrated with a ferromagnetic plate.

FIG. 3E is a front view of a PSD 300, according to an embodiment of the present disclosure, the receptacle 336 configured to encapsulate a larger portion 15 of the earphones 10 from FIG. 4D into the front of the device.

FIGS. 3A-3E illustrate some embodiments wherein a receiving cavity (receptacles 336) comprise a retention mechanism to releasably retain the first portion of earphones within the receptacle until a second portion of the earphones is grasped by the user to remove the earphones from the PSD 300.

FIGS. 4A and 4B are perspective views of a PSD 400 according to an embodiment of the present disclosure, the PSD 400 configured to accept earphones 10 having a stem 12 of at least a first and a second length. More particularly, FIG. 4A illustrates the earphones 10a, 10b having a stem 12a of the first length. Charging pins are disposed within the PSD 400 to accommodate the charging contacts of the earphones 10a, 10b having stems 12a of the first length (see the charging pins 548 and charging contacts 16a of FIG. 5A). Conversely, FIG. 4B illustrates the earphones 10c, 10d having a stem 12c of the second length, wherein the second length of the stem 12c is greater than the first length of the stem 12a. The PSD 400 has a length sufficient to accommodate the charging contacts 16c of the second length of the stem 12c of the wireless earphone to enable charging of the earphones 10c, 10d. Charging of the earphones 10 may occur once the charging contacts 16 of an earphone 10 contacts the charging pins of the PSD 400 (see the charging pins 548, 550 of FIG. 5A). Charging may continue until the earphones are fully charged or the earphones 10 are removed from the PSD 400. In one embodiment, the PSD 400 may be particularly configured to provide "smart charging" such that the earphones 10 are charged to an optimal charge state.

FIG. 4C is a rear view of the PSD 400 of FIGS. 4A, 4B, according to an embodiment of the present disclosure, and having a wireless charging coil 444a located proximal to a ferromagnetic backing 446a.

FIG. 4D is a rear view of the PSD 400 of FIGS. 4A and 4B, according to an embodiment of the present disclosure, and showing a charging coil 444b can be integrated with the ferromagnetic backing 446b required for magnetic attachment.

FIGS. 5A and 5B illustrate an interaction between two styles of earphones 10 with a PSD 500, according to an embodiment of the present disclosure, the PSD 500 similar in at least some respects to the PSDs 100-400 of FIGS. 1A-4D. FIG. 5A is a detailed diagram of a canal 512 of the PSD 500. Two stems 12a, 12c of earphones are superimposed on each other and disposed at the canal 512 (see the earphones 10 on FIGS. 1B and 1C). The stem 12a has charging contacts 16a. The canal 512 has charging pins 548 disposed so as to electrically couple with the charging contacts 16a of the stem 12a. The stem 12c has charging contacts 16c. The canal 512 is further configured with charging pins 550 disposed so as to electrically couple to the charging contacts 16c of the stem 12c. In one embodiment, the canal 512 is configured with both the charging pins 548 and the charging pins 550. In one embodiment, the canal 512 is configured with one of either the charging pins 548 or the charging pins 550.

In FIG. 5B, the charging pins 548, 550 are supplanted by elongated charging pins 552. Stems 12a, 12b are superimposed for illustrative purposes with the canal 512 of the PSD 500. The elongated charging pins 552 are disposed and configured so as to electrically couple with the charging contacts 16a, 16c of the stems 12a, 12c, as well as with charging contacts that may be disposed between the loci of the charging pins 548, 550 of FIG. 5A. Said otherwise, the elongated chagrining pins 552 are configured to electrically couple with charging contacts that may be disposed at any of a variety of positions along the stem of an earphone. The circuitry to electrically charge the earphones 10 includes first electrical contacts (charging pins 548) at a first position within the canals 512 to charge the earphones with the stem 12a having a first length and a second electrical contacts (charging pins 550) at a second position within the canals 512 to charge the earphones with stem 12c having a second length (see the first length 14a in FIG. 1B and the second length 14c in FIG. 1C).

FIG. 6 is a perspective view of a PSD 600, according to an embodiment of the present disclosure, and with the PSD 600 disposed at a shirt 20. The PSD 600 comprises an affixing mechanism configured to enable the PSD to be wearable. With the PSD 600 worn on, e.g., a shirt 20, a blouse, etc., the PSD 600 permits keeping the earphones 10 close by and facilitates quick and easy transfer of the earphones 10 between the PSD 600 and a user's ears. The earphone 10 can be accessed from and returned to the PSD 600 using a single hand. The PSD 600 may attach to the shirt 20 using one or more of magnets, magnetic back piece, a clip, a pin, or another appropriate means disposed at a detachable back piece of the PSD 600, as further described elsewhere herein.

Figure 7B:
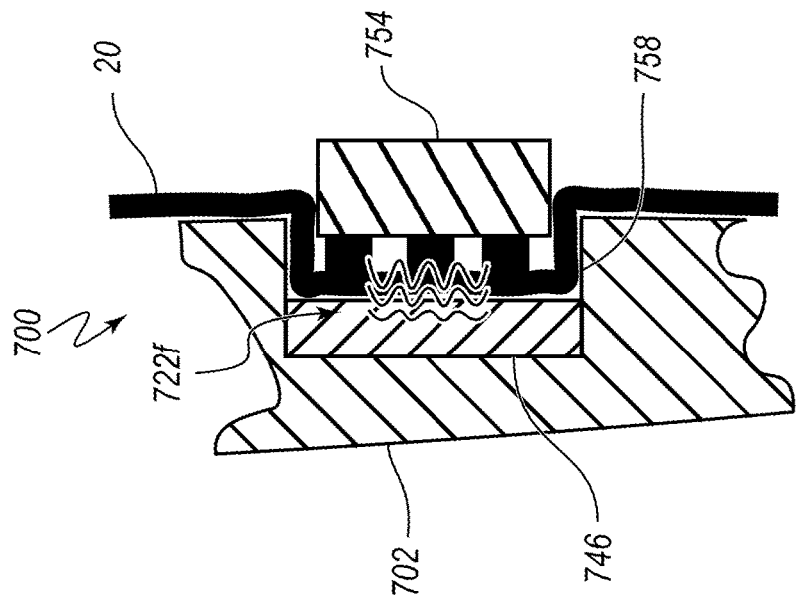
FIG. 7B is an enlarged cross-sectional view of the PSD of FIG. 7A showing detail of a recess.
Figure 7A:
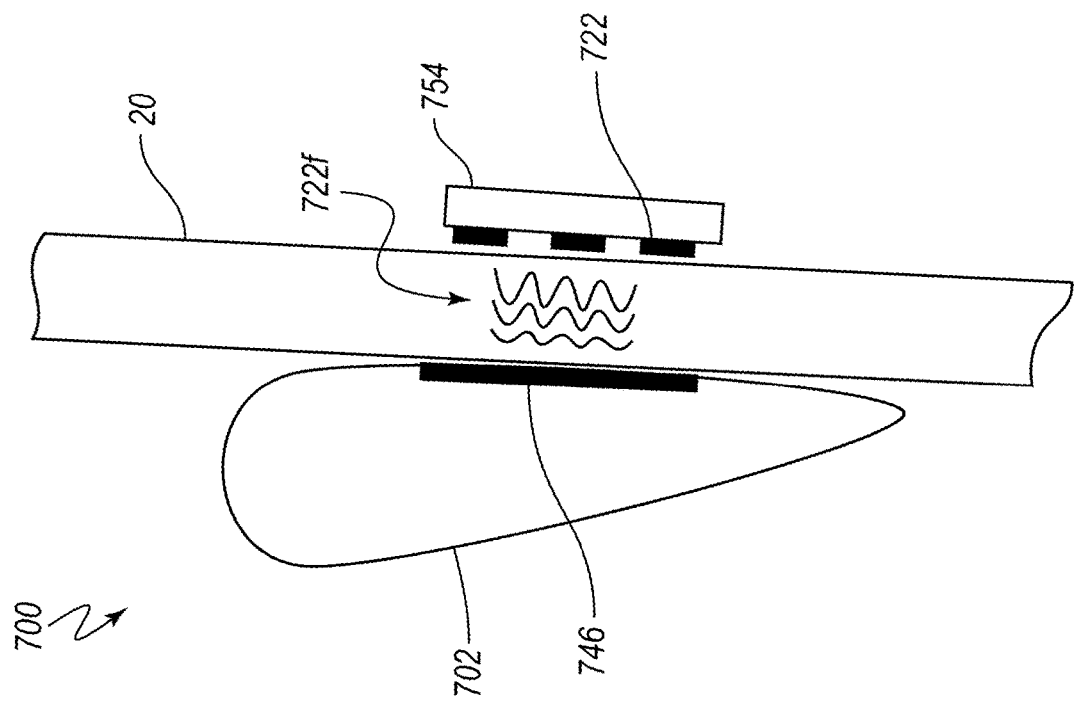
FIG. 7A is a cross-sectional view of a PSD, according to an embodiment of the present disclosure, and with the PSD attached to a mounting shirt.

FIG. 7A is a cross-sectional view of a PSD 700, according to an embodiment of the present disclosure, and with the PSD 700 attached to a mounting fabric (e.g., a shirt, fabric, or other material) ("shirt") 20. The PSD 700 comprises a detachable back piece 754 and ferromagnetic plate (e.g., a stainless-steel plate) ("plate") 756. The back piece 754 may comprise one or more magnets 722. The back piece 754 is disposed at an interior surface of the shirt 20. The shirt 20 (or other material) may permit a magnetic force 722f to penetrate through the shirt 20 to permit the magnets 722 to magnetically couple to the plate 756 whereby the PSD 700 may be retained in a desired place at an outer surface of the shirt 20. Said otherwise, the affixing mechanism of the PSD 700 comprises a detachable back piece 754 to be positioned on an opposing side of a material, the opposing side opposite a side where the body 702 is to be positioned and one or more magnets 722 produce a magnetic field 722f through the material of the article (e.g., a shirt, a blouse, etc. 20), the magnetic field 722f to attract the back piece 754 toward the body 702.

FIG. 7B is an enlarged cross-sectional view of the PSD 700 of FIG. 7A showing detail of the recess 758. The recess 758 that is configured with the plate 746. With the plate 746 disposed in the recess 758, the recess is configured to receive material of the shirt 20 (or other article) and the magnetic back piece 754. The magnetic force 722f attracts the back piece 754 to the plate 746 trapping a portion of the shirt 20 within the recess 758 and between the back piece 754 and the plate 746. The recess 758 enables the back piece 754 to nest against the plate 746 and lock the portion of the shirt 20 into place to reduce slippage of the PSD 700 relative to the surface of the shirt 20.

FIGS. 8A-8C are detailed views of a detachable back piece 854 of a PSD 800, according to an embodiment of the present disclosure. FIG. 8A is a side view of the detachable back piece 854. The detachable back piece 854 comprises a support 858 and one or more magnets 822. The support 858 may be formed of any appropriate material, such as, e.g., plastic, metal, ceramic, etc. The detachable back piece 854 can be manufactured to any appropriate shape or profile. The magnet(s) 822 may be fixedly mounted to the support 858.

FIG. 8B is a top view of a detachable back piece 854 of a PSD 800, wherein the support 858 has a straight bar shape 860.

FIG. 8C is a top view of a detachable back piece 854 of a PSD 800, wherein in the support 858 has a circular shape 862 to optimally attach to some PSD designs. The present disclosure anticipates the detachable back piece 854 may take any of a number of shapes such as an ellipse, "+" or "T" shape etc., as may be appropriate to a shape of a particular PSD configuration. The present disclosure further anticipates an embodiment having no detachable back piece 854.

Figure 9:
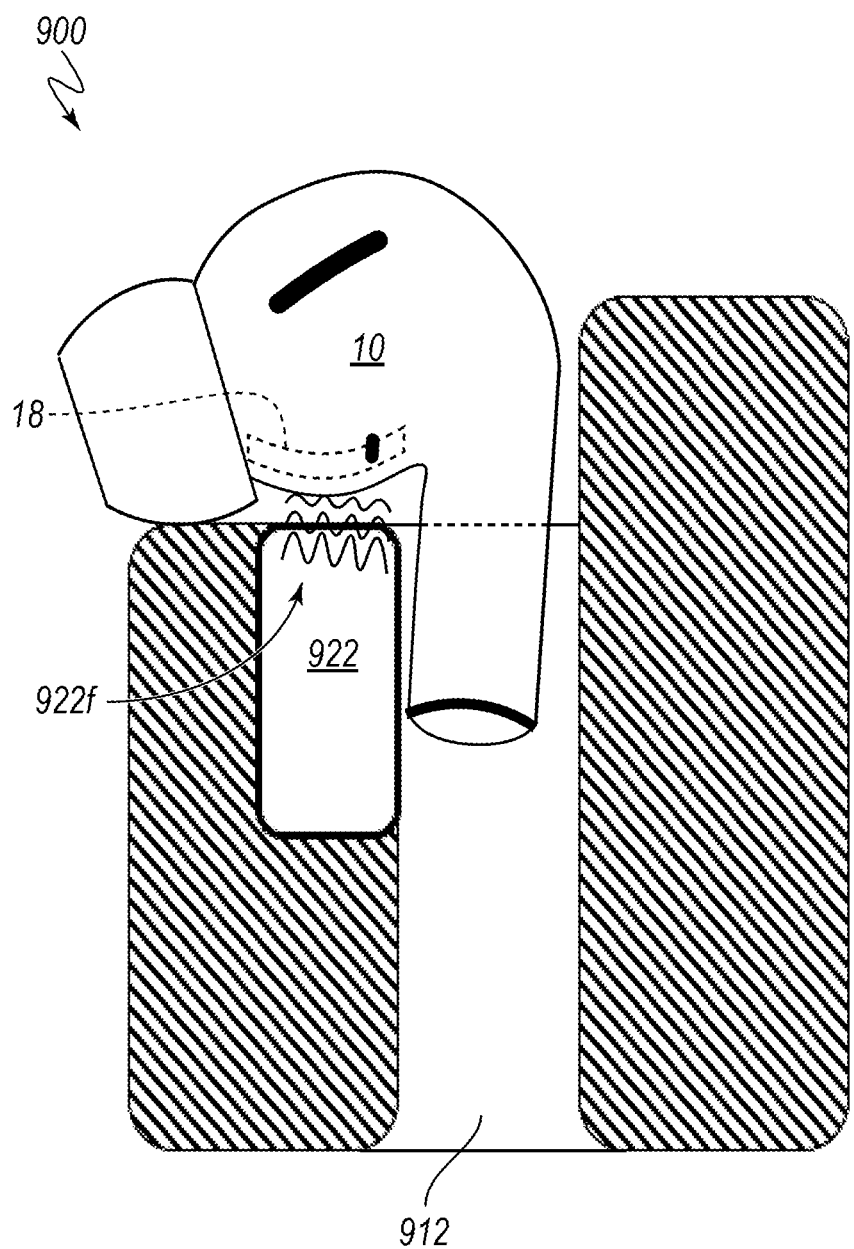
FIG. 9 is a cross-sectional view of a PSD, according to an embodiment of the present disclosure, and having a magnet embedded in the PSD.

FIG. 9 is a cross-sectional view of a PSD 900, according to an embodiment of the present disclosure, and having a magnet 922 embedded in the PSD 900. A canal 912 is shown for reference. The magnet 922 produces a magnetic force 922f to attract a magnetic part 18 of an earphone 10 to secure the earphone 10 in place at the PSD 900.

Figure 10B:
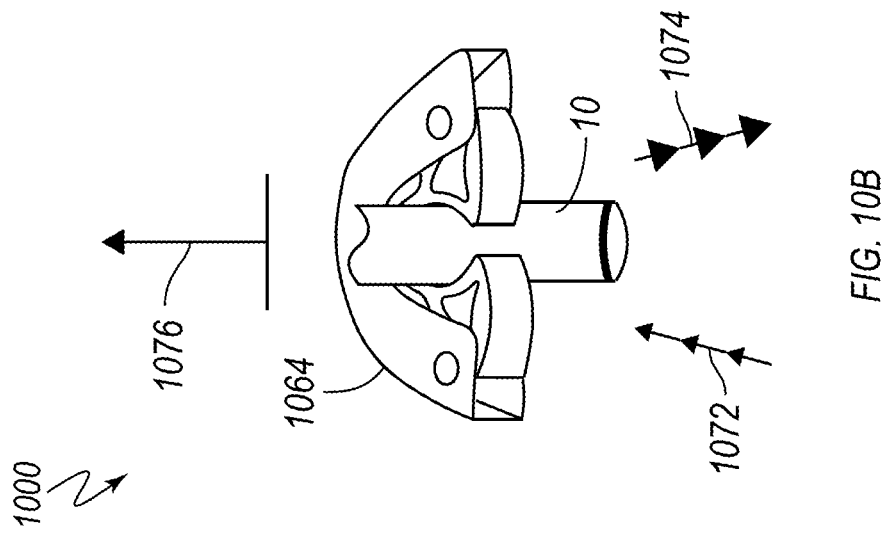
FIG. 10B is a perspective view of the PSD of FIG. 10A, according to an embodiment of the present disclosure, and having an earphone disposed at the clip or one-way door.
Figure 10A:
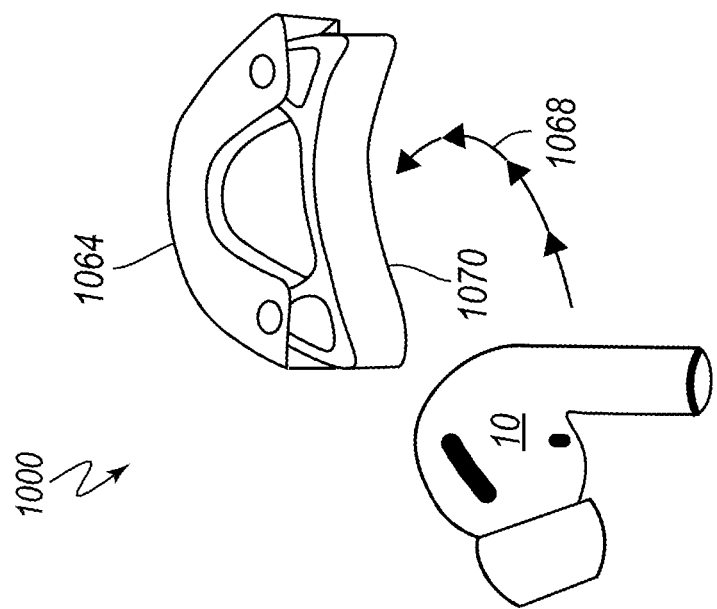
FIG. 10A is a perspective view of a PSD, according to an embodiment, wherein in the PSD comprises a clip or one-way door.

FIGS. 10A and 10B are perspective views of a PSD 1000, according to an embodiment of the present disclosure, wherein the PSD 1000 comprises a clip or one way-door 1064. In FIG. 10A, the clip or one-way door 1064 shown in an open position and ready to receive an earphone 10. The earphone 10 may be disposed to the clip or one-way door 1064 by moving the earphone 10 toward 1068 a receiver 1070 of the clip or one-way door 1064.

FIG. 10B shows the clip or one-way door 1064 in a closed position after it has received an earphone 10. A first force 1072 is applied to insert the earphone 10 into the clip or one-way door 1064. A second force 1074, equal to or greater than the first force 1072 and in an approximately opposite direction may be used to remove the earphone 10 from the clip or one-way door 1064. In one embodiment, a force 1076 in a direction orthogonal to the clip or one-way door 1064 may be used to remove the earphone 10. With the earphone 10 inserted into the clip or one-way door 1064, the receiver exerts a force (squeezes) the earphone 10 whereby the earphone 10 is retained at the PSD 1000 until the earphone 10 is retrieved by a user. Said otherwise, the clip or one-way door 1064 is a retention mechanism configured to afford a higher degree of resistance against a force having a component in at least one of a first and a second direction, and a lesser degree of resistance against a force having a component in a third direction, a relative resistance of force deriving from a magnitude of the component of force in each of the first, second, and third directions. Each of the first, second, and third directions may be orthogonal directions. This disclosure anticipates a means to defeat the resistance of the clip or one-way door by removing the earphone in an orthogonal direction to the original direction of placement. This disclosure also anticipates a means to defeat the resistance of the clip or one-way door by using a button or toggle, etc. (not shown). This disclosure anticipates accepting earphones with and without stems and those of varying sizes and dimensions.

Figure 11:
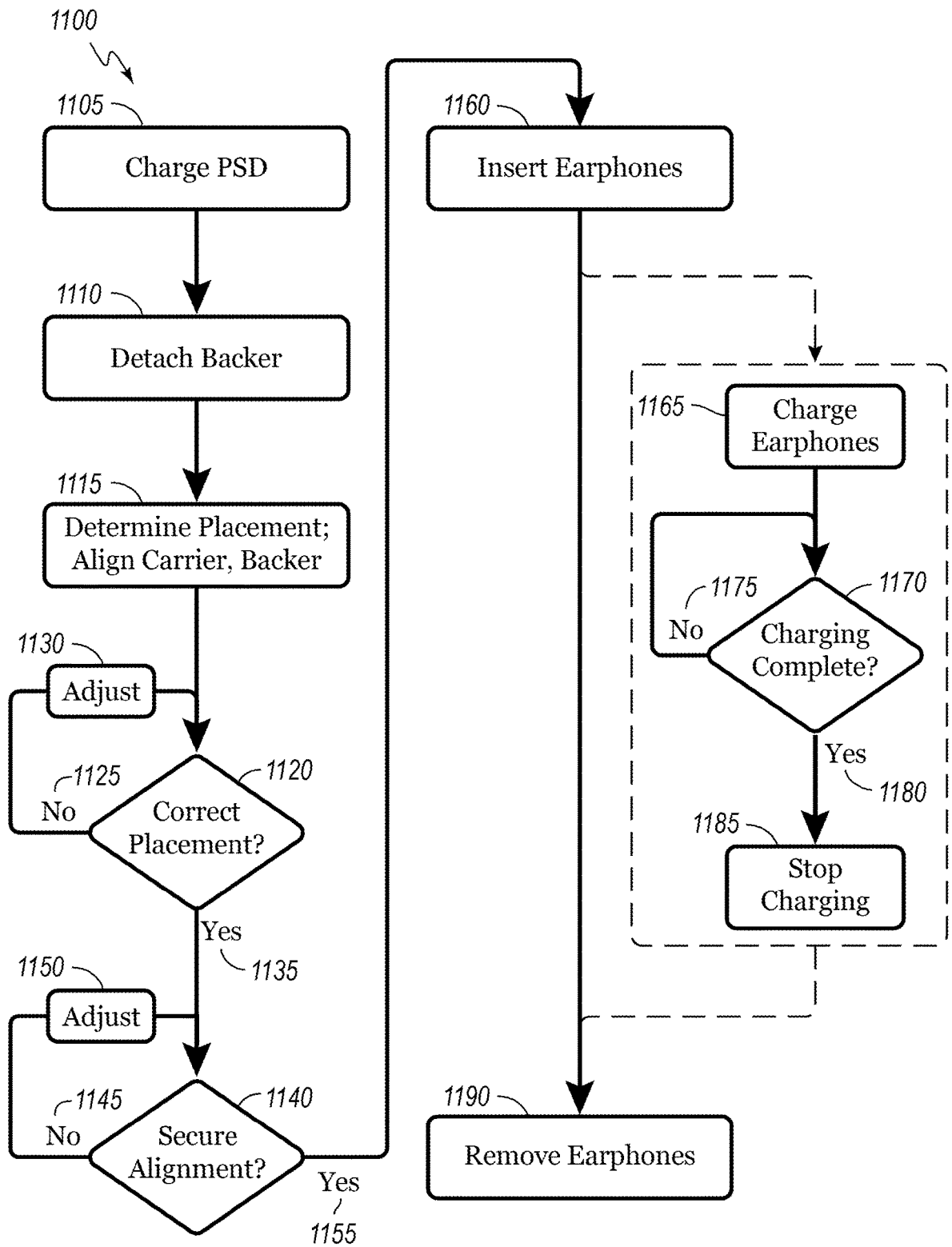
FIG. 11 is a diagram of a method of stowing a PSD, according to an embodiment of the present disclosure.

FIG. 11 diagrams a method 1100 of a PSD, according to an embodiment of the present disclosure. In an embodiment of a charging PSD, charge 1105 the PSD, preferably, prior to first use. Access the device and magnetic backing. If needed, detach 1110 the back piece. For convenience of the disclosure, a shirt is referenced as a support surface to which the PSD will be coupled. Determine 1115 placement of the PSD at a shirt and align the PSD and the back piece to couple the PSD to the shirt. Hold the magnetic backing in one hand and the disclosed device in the other. Move the device to an outer surface of the shirt and position in a desired location. Place the back piece at a corresponding position of an inner surface of the shirt and align with the PSD. In an appropriate embodiment, ensure the shape of the back piece aligns with the shape of the PSD for optimal security. Approximate the back piece and PSD until the magnetic force attaches them together. Determine 1120 if, relative to the shirt, the PSD has correct placement. If no 1125, the PSD and backing are not in an optimal location on the shirt, adjust 1130 the position of the PSD. For example, e.g., the PSD and back piece can be slid to a more appropriate location on the shirt after they have been attached to one another. Check 1120 again for correct placement. If yes 1135, the placement is correct, ensure 1140 the PSD is securely and stably mounted (aligned) on the shirt. If no 1145, the PSD is not securely affixed to the shirt, adjust 1150 the alignment of the PSD and back piece. If yes 1155, the PSD is securely aligned to the back piece and affixed to the shirt, the PSD is ready to receive earphones. The earphones can be removed from the original case. The original case can be left in a location that may not be convenient to the user doing common or daily activities, e.g., left plugged into a wall outlet, on a nightstand, in a car, in a bag etc. Said otherwise, the original case may be left at home, for example, while the PSD accompanies the user and the earphones throughout a day's activities, such as shopping, exercising, going to work, traveling, etc. When not in use, the earphones may be inserted 1160 into the PSD. To insert earphones into the PSD, a user can use as few as two fingers from one hand to hold one earphone and insert (or remove) the earphone. Varying designs will enable a user to place an earphone stem first into the PSD, the entire earphone body from the front, or the earpiece, first into the device. In some embodiments, a user can remove the earphone from the original case by grasping the earpiece and place the stems into the PSD. In an embodiment of a charging PSD, once the earphones are in place in the PSD, the PSD will automatically begin charging the earphones 1165. The PSD may be configured to periodically check 1170 a charge state of the earphones to determine if charging is complete. If no 1175, charging is not complete, the PSD continues to charge 1165 the earphones. If yes 1180, charging is complete, the PSD will stop charging 1185 the earphones. The PSD may periodically recheck the charge state to determine if the earphones have lost charge over time and, if so, the PSD may resume charging 1165 the earphones. At any time, and as often as desired, a user may insert the earphones 1160 into the PSD for storing/charging and remove the earphones 1190 for use. A user may, by way of non-limiting example, answer a phone call by retrieving an earphone (using as few as two fingers from one hand) from the PSD and placing the earphone in an ear. An important feature of the PSD is an ability to use one hand to insert or remove earphones from the PSD. Another important feature of PSD is that the earphone can remain communicatively connected to the user's phone or other portable electronic device, etc. so that the user can answer a call on the first ring without having to wait for a connection between the earphones and the phone.

EXAMPLES

Example 1. A stowing device for personal audio devices, comprising: a support body that is configured to be affixed to a surface of an article and to be portable with the surface of the article; new receiving cavities formed in the support body to correspond to a pair of personal audio devices, each receiving cavity configured to receive a first portion of a personal audio device of the pair of personal audio devices, wherein the two receiving cavities are unenclosed with an open top to provide ready access for a user to be able to grasp a second portion of each of the two personal audio devices; and an affixing mechanism mounted to the support body, the affixing mechanism configured to releasably secure the support body to the article.

Example 2. The stowing device of example 1, wherein the personal audio devices are earbuds, the second portion of each earbud being a speaker configured to be disposed in an outer ear, and the first portion of each earbud is a stem portion extending from the speaker to be positioned outside of the outer ear in a downward direction from the speaker.

Example 3. The stowing device of example 1, wherein the affixing mechanism is configured to enable the stowing device to be wearable.

Example 4. The stowing device of example 1, wherein the affixing mechanism comprises a detachable back piece to be positioned on an opposing side of a material of the article, the opposing side opposite of a side where the support body is to be positioned, and one or more magnets to produce a magnetic field through a material of the article, the magnetic field to attract the back piece toward the support body.

Example 5. The stowing device of example 4, wherein the support body includes a recess where the back piece can nest and lock into place to reduce slippage relative to the surface of the article.

Example 6. The stowing device of example 1, wherein the affixing mechanism comprises a pin.

Example 7. The stowing device of example 6, wherein the affixing mechanism further comprises: a joint to allow the pin to pivot at a coupled end; and a catch to releasably secure a free end of the pin.

Example 8. The stowing device of example 1, wherein the affixing mechanism comprises at least one of a magnet, a clip, a pocket clip, a pin, and a hook-and-loop fabric.

Example 9. The stowing device of example 1, each receiving cavity further comprising: a retention mechanism to releasably retain the first portion within the receiving cavity until the second portion is grasped to remove the earphone from the stowing device.

Example 10. The stowing device of example 9, wherein the retention mechanism comprises a magnet to produce a magnetic field within the receiving cavity.

Example 11. The stowing device of example 9, wherein the retention mechanism is configured to afford a higher degree of resistance against a force having a component in at least one of a first and a second direction, and a lesser degree of resistance against a force having a component in a third direction, a relative resistance of force deriving from a magnitude of the component of force in each of the first, second and third directions.

Example 12. The stowing device of example 1, wherein each receiving cavity is further configured to limit movement of the personal audio device disposed therein.

Example 13. The stowing device of example 1, wherein each receiving cavity includes a notch to engage or receive a bottom surface of the second portion of the personal audio device.

Example 14. The stowing device of example 1, further comprising an energy store; and a circuitry to electrically charge the personal audio devices.

Example 15. The stowing device of example 1, wherein the circuitry to electrically charge the personal audio devices includes first electrical contacts at a first position within the recesses to charge personal audio devices with a first portion having a first length and second electrical contacts at a second position within the recesses to charge personal audio devices with the first portion having a second length.

Example 16. The stowing device of example 1, wherein the article is one or more of an article of clothing, an accessory, an armband, and a bag.

Example 17. A stowage, or receptacle, for personal audio devices, comprising: a body defining a pair of recesses corresponding to a pair of personal audio devices, each audio device of the pair of audio devices comprising a first portion configured to be disposed in an outer ear of a user and a second portion extending from the first portion and configured to be disposed outside the outer ear, wherein each recess is configured to receive at least the first portion of one of the pair of personal audio devices, and wherein each recess is unenclosed to provide open access for the user to grasp the speaker portion of the personal audio device; and a body affixing mechanism mounted to the body, the body affixing mechanism configured to secure the body to a surface to enable the stowage to be affixed to a material of an article of clothing.

Example 18. The stowage of example 17, wherein the pair of personal audio devices are one of a pair of earbuds and a pair of earphones.

Example 19. The stowage of example 17, wherein the body affixing mechanism comprises a magnet to produce a magnetic field through the material.

Example 20. The stowage of example 17, wherein the body affixing mechanism comprises a pin.

Example 21. The stowage of example 17, each recess further comprising: a retention mechanism to releasably retain the personal audio device until the personal audio device is grasped to remove the personal audio device from the stowage.

Example 22. The stowage of example 21, wherein the retention mechanism comprises a magnet to produce a magnetic field within the recess.

Example 23. The stowage of example 21, further comprising an energy store; and circuitry to electrically charge the personal audio devices.

Example 24. A brooch for stowing earphones, comprising: a body defining a pair of receiving cavities corresponding to a pair of earphones, each earphone of the pair of earphones comprising a speaker configured to be disposed in an outer ear of a user and a stem coupled to and extending from the speaker and configured to be disposed outside the outer ear, wherein each receiving cavity is configured to receive the stem of one of the pair of earphones, and wherein each receiving cavity is open at a top area and lidless to allow access for the user to grasp the speaker of earphone; and an affixing mechanism configured to secure the body to a surface to enable the brooch to be affixed to a material of an article of clothing, the affixing mechanism comprising: a pin having a coupled and a free end; a joint at the coupled end of the pin to allow the pin to pivot; and a catch to receive and releasably secure the free of the of the pin.

Example 25. The brooch of example 24, wherein the brooch conforms generally to a shape of an earphone and at least one of a magnet and a clip to retain earphones.

Example 26. A portable true wireless earphone storage device (PSD) comprising: a case configured to receive and, by retention mechanism, retain a true wireless earphone, the case to be disposed on an article of and affixed thereto by a back piece to keep the earphone proximal and easily accessible.

Example 27. The PSD of example 26, wherein the article is one of a piece of clothing, an accessory, and a hand-carried item.

Example 28. The PSD of example 26, wherein the back piece comprises one of a magnet and a magnetic portion that can attach to a magnet or magnetic portion of a support on the other side of a piece of material.

Example 29. The PSD of example 26, wherein the PSD is configured to be secured to material using at least one of a magnet, a clip, a pocket clip, a pin, and a hook-and-loop fabric.

Example 30. The PSD of example 27, wherein the PSD is integrated in the accessory, the accessory comprising one of a watch, a watchband, a necklace, an armband, a hat, a lapel clip, a lapel pin, a sleeve clip, and a belt attachment.

Example 31. The PSD of example 26, wherein the PSD is configured to electrically charge the earphone.

Example 32. The PSD of example 30, wherein the PSD is configured to wirelessly charge the earphone.

Example 33. The PSD of example 26, wherein the PSD is configured to couple to a charging device by a coupling mechanism of a portable wireless telephone.

Example 34. The PSD of example 26, wherein the PSD is configured to receive an earphone with one of a first stem length and a second stem length.

Example 35. The PSD of example 26, wherein the earphone is magnetically retained at the PSD.

Example 36. The PSD of example 26, wherein the PSD comprises at least one of a plastic component, a metallic component, and a ceramic component.

Example 37. The PSD of example 26, wherein the retention mechanism comprises one of an elastomer, a plastic, and a foam.

Example 38. The PSD of example 29, wherein the one of an elastomer, a plastic and a foam is configured to snugly conform to and retain the earphone against a force less than a preferred force.

Example 39. The PSD of example 29, wherein the elastomer comprises cilia-like members.

Example 40. The PSD of example 26, wherein the retention mechanism comprises a one-way valve/door secures the earphone at the PSD.

Example 41. The PSD of example 26, wherein the retention mechanism comprises a releasable clip configured to retain the earphone.

Example 42. The PSD of example 26, wherein the retention mechanism receives the earphone against a first force, and retains the earphone until a second force greater than the first force is applied.

Example 43. The PSD of example 26, wherein the retention mechanism comprises a highly compliant polymer that at least partially engulfs the earphone.

Example 44. The PSD of example 26, wherein the retention mechanism comprises a non-Newtonian polymer that offers less resistance when the earphone is pulled slowly and offers increasing resistance with application of increasing force on the earphone.

Example 45. The PSD of example 26, wherein the retention mechanism comprises a Chinese finger trap contraption that easily accepts the earphone and offers resistance against a force to remove the earphone.

Example 46. The PSD of example 37, wherein the retention mechanism comprises a means to defeat the resistance imparted by the Chinese finger trap against removal of the earphone.

Example 47. The PSD of example 26, wherein the retention mechanism is configured to afford a higher degree of resistance against a force having a component in at least one of a first and a second direction, and a lesser degree of resistance against a force having a component in a third direction, a relative resistance of force deriving from a magnitude of the component of force in each of the first, second, and third directions.

Example 48. The PSD of example 26, wherein the PSD is configured with a notch, the notch assisting to guide the earphone into position at the PSD.

Example 49. The PSD of example 26, wherein the retention mechanism is configured to interact with at least one of a stem of the earphone and an earpiece of the earphone.

Example 50. The PSD of example 26, wherein the PSD is configured to receive and retain a pair of earphones.

Example 51. The PSD of example 42, wherein the case of the PSD conforms generally and closely to a shape of the earphone, whereby the PSD is minimally largely than the pair of earphones.

Example 52. The PSD of example 26, wherein the case of the PSD is configured to have an ornate appearance that one of enhances and obfuscates the presence of the earphone.

It will be obvious to those having skill in the art that many changes may be made to the details of the above-described embodiments without departing from the underlying principles of the invention. The scope of the present invention should, therefore, be determined only by the following claims.

What is claimed is:

1. A stowing device for earphones, comprising:
   a support body that is configured to be affixed to a surface of an article and to be portable with the surface of the article;
   two receiving cavities formed in the support body to correspond to a pair of earphones, each receiving cavity configured to receive a first portion of an earphone of the pair of earphones, wherein the two receiving cavities are unenclosed with an open top to provide ready access for a user to be able to grasp a second portion of each of the two earphones; and
   an affixing mechanism mounted to the support body, the affixing mechanism configured to releasably secure the support body to the article, wherein the affixing mechanism comprises:
   a detachable back piece to be positioned on an opposing side of a material of the article, the opposing side opposite of a side where the support body is to be positioned.

2. The stowing device of claim 1, wherein the earphones are earbuds, the second portion is a speaker configured to be disposed in an outer ear, and the first portion is a stem portion extending from the speaker to be positioned outside of the outer ear in a downward direction from the speaker.

3. The stowing device of claim 1, wherein the affixing mechanism is configured to enable the stowing device to be wearable.

4. The stowing device of claim 1, wherein the affixing mechanism comprises
   one or more magnets to produce a magnetic field through a material of the article, the magnetic field to attract the pack piece toward the support body.

5. The stowing device of claim 4, wherein the support body includes a recession where the back piece can nest and lock into place to reduce slippage relative to the surface of the article.

6. The stowing device of claim 1, wherein the affixing mechanism comprises one or more pins that can penetrate a material.

7. The stowing device of claim 1, each receiving cavity further comprising:
   a retention mechanism to releasably retain the first portion within the receiving cavity until the second portion is grasped by the user to remove the earphone from the stowing device.

8. The stowing device of claim 7, wherein the retention mechanism comprises a magnet to produce a magnetic field within the receiving cavity.

9. The stowing device of claim 7, wherein the retention mechanism is configured to afford a higher degree of resistance against a force having a component in at least one of a first and a second orthogonal direction, and a lesser degree of resistance against a force having a component in a third orthogonal direction, a relative resistance of force deriving from a magnitude of the component of force in each of the first, second, and third orthogonal directions.

10. The stowing device of claim 7, wherein the retention mechanism comprises a releasable clip.

11. The stowing device of claim 1, wherein each receiving cavity is further configured to limit movement and rotation of the earphone disposed therein.

12. The stowing device of claim 1, wherein each receiving cavity includes a notch to engage or receive a bottom surface of the second portion of the headphone.

13. The stowing device of claim 1, further comprising
   an energy store; and
   circuitry to electrically charge the earphones.

14. The stowing device of claim 13, wherein the circuitry to electrically charge the earphones includes first electrical contacts at a first position within a recess to align with charging contacts on earphones having a stem of a first length and second electrical contacts at a second position within the recesses to align with charging contacts on earphones having a stem of a second, different length.

15. A receptacle for personal audio devices, comprising:
    a body defining a pair of recesses corresponding to a pair of personal audio devices, each audio device of the pair of audio devices comprising a first portion configured to be disposed in an outer ear of a user and a second portion extending from a speaker portion and configured to be disposed outside the outer ear, wherein each recess is configured to receive at least the first portion of one of the pair of personal audio devices, and wherein each recess is unenclosed to provide open access for the user to grasp the speaker portion of the personal audio device; and
    a body affixing mechanism mounted to the body, the body affixing mechanism configured to secure the body to a surface to enable the receptacle to be affixed to a material of an article of clothing, wherein the affixing mechanism comprises:
    a detachable back piece to be positioned on an opposing side of a material of the article, the opposing side opposite of a side where the support body is to be positioned.

16. The receptacle of claim 15, wherein the pair of personal audio devices are one of earbuds or earphones.

17. The receptacle of claim 15, wherein the body affixing mechanism comprises one or more magnets to produce a magnetic field through the material.

18. The receptacle of claim 15, wherein the body affixing mechanism comprises one or more pins.

19. The receptacle of claim 15, each receiving cavity further comprising:
    a retention mechanism to releasably retain the personal audio device until it is grasped by the user to remove the personal audio device from the receptacle.

20. The receptacle of claim 19, wherein the retention mechanism comprises a magnet to produce a magnetic field within the recess.

21. The receptacle of claim 15, further comprising
an energy store; and
circuitry to electrically charge the earphones using energy from the energy store.

* * * * *